United States Patent
Kashima et al.

(10) Patent No.: US 10,155,546 B2
(45) Date of Patent: Dec. 18, 2018

(54) VEHICLE HOOD

(71) Applicant: Kobe Steel, Ltd., Kobe-shi (JP)

(72) Inventors: Hiroko Kashima, Kobe (JP);
Masatoshi Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 116 days.

(21) Appl. No.: 15/450,762

(22) Filed: Mar. 6, 2017

(65) Prior Publication Data
US 2017/0282977 A1    Oct. 5, 2017

(30) Foreign Application Priority Data

Mar. 31, 2016  (JP) .................................. 2016-070580

(51) Int. Cl.
| | | |
|---|---|---|
| *B60J 7/00* | (2006.01) | |
| *B62D 25/12* | (2006.01) | |
| *B62D 25/10* | (2006.01) | |

(52) U.S. Cl.
CPC ........... *B62D 25/12* (2013.01); *B62D 25/105* (2013.01)

(58) Field of Classification Search
CPC ................ B01D 9/0018; B01D 9/0036; H01L 2924/0002; B60V 1/145; B65D 5/705; H05K 7/1497; H05K 7/20745; H05K 7/20836; H05K 7/20736; G06F 1/20
USPC .................................................... 296/187.09
See application file for complete search history.

(56) References Cited

U.S. PATENT DOCUMENTS

| | | | | |
|---|---|---|---|---|
| 5,115,878 | A * | 5/1992 | Hayata | B60R 21/00 180/69.21 |
| 5,706,908 | A * | 1/1998 | Sakai | B60R 13/0838 180/232 |
| 5,934,743 | A * | 8/1999 | Nohr | B60R 19/00 296/146.6 |
| 6,179,364 | B1 * | 1/2001 | Takahashi | B62D 25/105 296/191 |
| 6,883,627 | B1 * | 4/2005 | Staines | B60R 21/34 180/69.2 |
| 7,270,367 | B2 * | 9/2007 | Mairing | B60R 21/34 180/69.21 |
| 7,997,642 | B2 * | 8/2011 | Rocheblave | B60R 21/34 296/187.04 |
| 9,278,715 | B2 * | 3/2016 | Steinhilb | B62D 25/105 |
| 9,840,132 | B2 * | 12/2017 | Fujii | B60J 5/045 |

(Continued)

FOREIGN PATENT DOCUMENTS

JP    2011-11658    1/2011

*Primary Examiner* — Kiran B Patel
(74) *Attorney, Agent, or Firm* — Oblon, McClelland, Maier & Neustadt, L.L.P.

(57) ABSTRACT

Provided is a vehicle hood capable of improving pedestrian protection performance by suppressing an increase in acceleration secondary peak while increasing an acceleration primary peak. A vehicle hood includes an outer panel, an inner panel, and a deformable part that deforms with the outer panel when the outer panel deforms toward the inner panel, in which the inner panel includes a bottom, an upright wall, and an opposed part, and the deformable part includes a joint part joined to an intermediate wall of the upright wall or the opposed part, and a displaceable part that is close to or in contact with the outer panel above the bottom and is capable of being downward displaced with the outer panel to below the joint part when the outer panel deforms toward the inner panel.

8 Claims, 4 Drawing Sheets

(56) References Cited

U.S. PATENT DOCUMENTS

| | | | | |
|---|---|---|---|---|
| 9,845,115 B2* | 12/2017 | Farooq | .................. | B33Y 80/00 |
| 9,868,472 B2* | 1/2018 | Takada | .................. | B62D 25/12 |
| 9,889,890 B1* | 2/2018 | Manginen | ............ | B62D 25/12 |
| 2005/0082874 A1* | 4/2005 | Ikeda | .................... | B60R 21/34 296/193.11 |
| 2005/0082875 A1* | 4/2005 | Ikeda | .................... | B60R 21/34 296/193.11 |
| 2005/0088016 A1* | 4/2005 | Ito | ......................... | B60R 21/34 296/193.11 |
| 2005/0280287 A1* | 12/2005 | Koura | .................... | B60R 21/34 296/193.11 |
| 2006/0163915 A1* | 7/2006 | Ikeda | .................... | B60R 21/34 296/193.11 |
| 2009/0065277 A1* | 3/2009 | Wang | .................. | B62D 25/105 180/69.2 |
| 2009/0195031 A1* | 8/2009 | Ishitobi | .................. | B60R 21/34 296/193.11 |
| 2010/0140979 A1* | 6/2010 | Seksaria | ............. | B62D 25/105 296/193.11 |
| 2010/0314907 A1* | 12/2010 | Iwano | .................. | B62D 25/105 296/187.09 |
| 2011/0169303 A1* | 7/2011 | Ikeda | .................... | B60R 21/34 296/193.11 |
| 2012/0285759 A1* | 11/2012 | Ikeda | .................... | B60R 21/34 180/69.2 |
| 2013/0015682 A1* | 1/2013 | Ikeda | .................... | B60R 21/34 296/187.04 |
| 2013/0106142 A1* | 5/2013 | Yonezawa | ............. | B60R 21/34 296/193.11 |
| 2013/0175827 A1* | 7/2013 | Hashimoto | ............. | B60R 21/34 296/193.11 |
| 2014/0062142 A1* | 3/2014 | Ikeda | .................... | B62D 25/12 296/193.11 |
| 2015/0291123 A1* | 10/2015 | Yoshida | ............... | B62D 29/008 296/187.04 |
| 2015/0307135 A1* | 10/2015 | Lindmark | ............. | B62D 25/12 296/191 |
| 2015/0353141 A1* | 12/2015 | Yoshida | ............... | B62D 25/105 296/193.11 |
| 2015/0360729 A1* | 12/2015 | Chikada | ............... | B62D 25/105 296/187.09 |
| 2016/0083019 A1* | 3/2016 | Takada | .................... | B60R 21/34 296/193.11 |
| 2016/0114663 A1* | 4/2016 | Kawashima | ............ | B60J 5/107 49/501 |
| 2016/0129865 A1* | 5/2016 | Mankame | ............ | B62D 25/105 296/187.05 |
| 2016/0144898 A1* | 5/2016 | Fujii | ....................... | B60J 5/045 296/191 |
| 2016/0152280 A1* | 6/2016 | Inoue | .................. | B62D 25/105 296/193.11 |
| 2016/0207494 A1* | 7/2016 | Hector, Jr. | .............. | B60R 21/34 |
| 2016/0222927 A1* | 8/2016 | Kalauch | ................ | B60K 13/02 |
| 2016/0251033 A1* | 9/2016 | Kolar, Jr. | ................ | B60R 21/34 296/193.11 |
| 2016/0280279 A1* | 9/2016 | Yoshida | ................. | B62D 25/12 |
| 2016/0375747 A1* | 12/2016 | Kawashima | ............ | B60J 5/101 49/475.1 |
| 2017/0158163 A1* | 6/2017 | Yoshida | ................. | B60R 21/34 |
| 2017/0188650 A1* | 7/2017 | Hector, Jr. | .............. | A42B 3/10 |
| 2017/0241191 A1* | 8/2017 | Farooq | ................. | B62D 25/10 |
| 2017/0274937 A1* | 9/2017 | Hammer | ................. | B62D 25/082 |
| 2017/0282978 A1* | 10/2017 | Yoshida | ............... | B62D 27/026 |

\* cited by examiner

VEHICLE HOOD

BACKGROUND

The present invention relates to a vehicle hood having an outer panel and an inner panel.

A vehicle hood having an outer panel and an inner panel has been known. Such a vehicle hood requires improvement in pedestrian protection performance. For example, Japanese Unexamined Patent Application Publication No. 2011-11658 (JP-A-2011-11658) discloses that a reinforcement component is provided between the outer panel and the inner panel to improve pedestrian protection performance. A cross section of the reinforcement component has a substantially hat shape. Specifically, the reinforcement component includes a pair of flange parts to be connected to the bottom of the inner panel, a pair of shock absorbing vertical walls rising from the respective flange parts toward the outer panel, and a top that connects between the ends (upper ends) on a side, which is close to the outer panel, of the shock absorbing vertical walls. The top is opposed to the outer panel at a position upwardly away from the bottom of the inner panel.

In such a vehicle hood, when a head collides with the outer panel, the shock absorbing vertical wall of the reinforcement component particularly absorbs the shock during the collision of the head while deforming with the outer panel. This increases an acceleration primary peak (energy absorption amount) in an initial stage of collision, and decreases an acceleration secondary peak in the latter half of the collision. This decreases a so-called head injury criterion (HIC) score, leading to improvement in pedestrian protection performance.

SUMMARY

In the vehicle hood as described in JP-A-2011-11658, although the acceleration primary peak increases due to deformation of the reinforcing component with the outer panel in the initial stage of collision of the head with the outer panel, only a narrow gap exists between a built-in component such as an engine disposed below the hood and the inner panel. Thus, when the collision energy must be absorbed in a short collision stroke, the acceleration secondary peak may also increase. That is, if the shock absorbing vertical wall is deformed, and if further downward displacement of the top is restricted due to contact of the vertical wall with the inner panel, the reinforcing component then acts as a resistance against deformation of the outer panel. In such a case, the acceleration secondary peak increases, resulting in an increase in HIC score. In particular, an aluminum hood lighter than a steel hood has an acceleration primary peak lower than the steel hood due to the light weight. This makes it difficult to control the HIC score to be low and provide predetermined pedestrian protection performance.

An object of the invention is to provide a vehicle hood capable of improving the pedestrian protection performance by suppressing an increase in acceleration secondary peak while increasing the primary acceleration peak.

To solve the above-described problem, the invention provides a vehicle hood that includes an outer panel, an inner panel disposed below the outer panel, and a deformable part that is joined to the inner panel and deforms with the outer panel when the outer panel deforms toward the inner panel, in which the inner panel includes a bottom, an upright wall rising from the bottom toward the outer panel, and an opposed part that is connected to an upper end of the upright wall and opposed to the outer panel, and the deformable part includes a joint part joined to an intermediate wall of the upright wall, the intermediate wall being located between a lower end and the upper end of the upright wall, or joined to the opposed part, and a displaceable part that is close to the outer panel above the bottom and is capable of being downward displaced with the outer panel to below the joint part when the outer panel deforms toward the inner panel.

In the vehicle hood, the joint part is joined to the intermediate wall or the opposed part, and the displaceable part can be displaced with the outer panel toward the bottom located below the joint part. It is therefore suppressed that the deformable part acts as a resistance against deformation of the outer panel due to the collapsed residues of the deformable part. In the vehicle hood, therefore, the displaceable part is displaced downward together with the outer panel in the initial stage of collision of the head with the outer panel. In other words, components having a larger weight are displaced with the head toward the inner panel. Hence, the acceleration primary peak increases. In addition, the displaceable part can continue deformation toward the bottom located below the joint part in the latter stage of the collision, which effectively decreases the acceleration secondary peak.

In such a case, it is preferred that the joint part is joined to the intermediate wall, and the displaceable part has a shape bent to be convex upward and is invertible so as to be convex downward while being downward displaced with the outer panel to below the joint part.

This makes it possible to effectively decrease the acceleration secondary peak while avoiding a significant increase in gap between the inner panel and the outer panel. Specifically, the secondary acceleration peak is effectively decreased by inverting the displaceable part to be convex downward while the displaceable part is displaced with the outer panel toward the bottom of the inner panel (the latter stage of collision). The joint part is joined to the intermediate wall of the upright wall, and displaceable part acts as a deformation resistance in the initial stage of collision with the pedestrian head; hence, the energy absorption amount can be increased in the initial stage of collision compared with the case where the joint part is joined to the opposed part. The gap between the outer panel and the built-in component disposed below the vehicle hood can be correspondingly set narrow.

Furthermore, in such a case, the dimension between the bottom and the intermediate wall in the vertical direction is preferred to be set to ½ or more of the dimension between the bottom and the opposed part in the vertical direction.

This suppresses contact of the displaceable part with the bottom when the displaceable part is inverted to be convex downward. It is therefore effectively suppressed that the deformable part remains collapsed.

In the vehicle hood, it is preferred that the upright wall includes a lower vertical wall connecting the bottom and the intermediate wall and an upper vertical wall connecting the intermediate wall and the opposed part, the intermediate wall is flat and intersects with both the lower vertical wall and the upper vertical wall, the deformable part is made up of a component different from the inner panel, the joint part is flat, the displaceable part includes an inclined part that is flat and connected to the joint part and is inclined so as to approach the outer panel as being more away from the joint part in a direction from the intermediate wall to the bottom in parallel with the intermediate wall, and an angle defined by the joint part and the inclined part is an obtuse angle.

In this way, the stiffness of the inner panel is reliably provided by the vertical walls compared with the case where the deformable part is formed by cutting and raising a portion (including the lower vertical wall or the upper vertical wall) of the inner panel. Furthermore, the angle defined by the joint part and the inclined part is an obtuse angle, thereby the displaceable part is easily inverted such that the displaceable part becomes convex downward while the displaceable part is displaced with the outer panel toward the bottom. The acceleration secondary peak is therefore more reliably decreased.

In such a case, the angle defined by the joint part and the inclined part is preferred to be 135° to 180°.

Thus, in the initial stage of collision of the head with the outer panel, the inclined part is impacted and thus the acceleration primary peak effectively increases. In the latter stage of the collision, the displaceable part is further acceleratingly inverted while the displaceable part is displaced with the outer panel toward the bottom.

In the vehicle hood, it is preferred that the bottom, the upright wall, and the opposed part each have a shape extending in a vehicle front-back direction in a side portion in a vehicle width direction of the inner panel, and the deformable part has a shape extending along the vehicle front-back direction.

In this way, the HIC score of the side portion in the vehicle width direction, which tends to be higher than the HIC score in the middle of the vehicle hood, is effectively decreased.

In such a case, the displaceable part preferably has a high-stiffness part having stiffness higher than that of any other portion of the displaceable part, and has a shape that continuously runs to extend along the vehicle front-back direction.

In this way, when an impact is applied to a specific portion of the displaceable part, the impact load propagates along the high-stiffness part from the specific portion in a front-back direction of the displaceable part. Hence, the displaceable part is generally displaced toward the bottom of the inner panel, i.e., components are displaced with the outer panel while being increased in mass, leading to an increase in acceleration primary peak.

For example, the high-stiffness part may have a shape that is recessed from another portion of the displaceable part so as to be convex downward.

In this way, the invention provides a vehicle hood capable of improving the pedestrian protection performance by suppressing an increase in acceleration secondary peak while increasing the acceleration primary peak.

DETAILED DESCRIPTION

A vehicle hood of one embodiment of the present invention is now described with reference to FIGS. 1 to 5.

Figure 1:
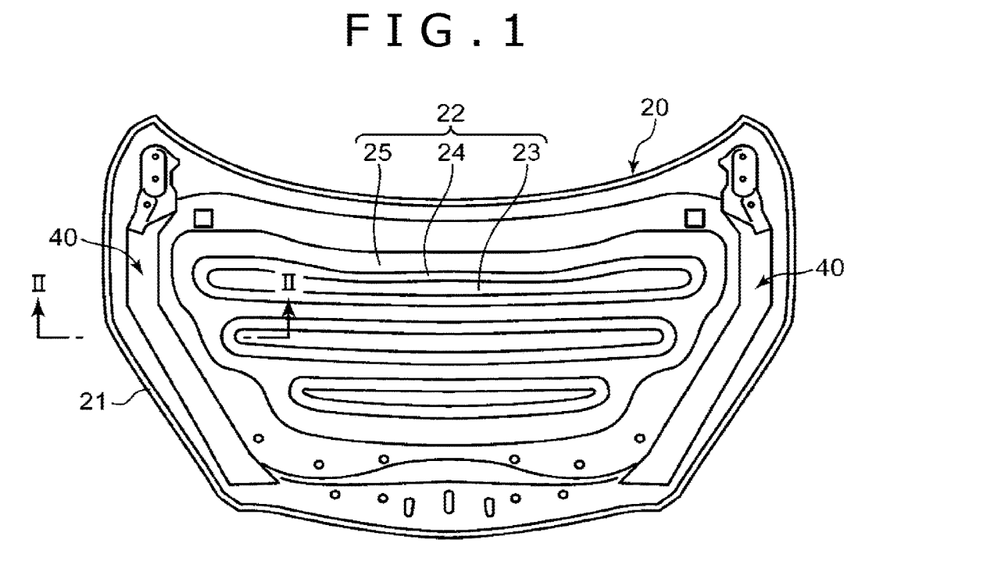
FIG. 1 is a schematic plan view of an inner panel of a vehicle hood of one embodiment of the present invention.

The vehicle hood has an outer panel 10 (see FIG. 2), an inner panel 20 disposed below the outer panel 10, and a deformable part 40. In FIG. 1, illustration of the outer panel 10 is omitted.

Figure 2:
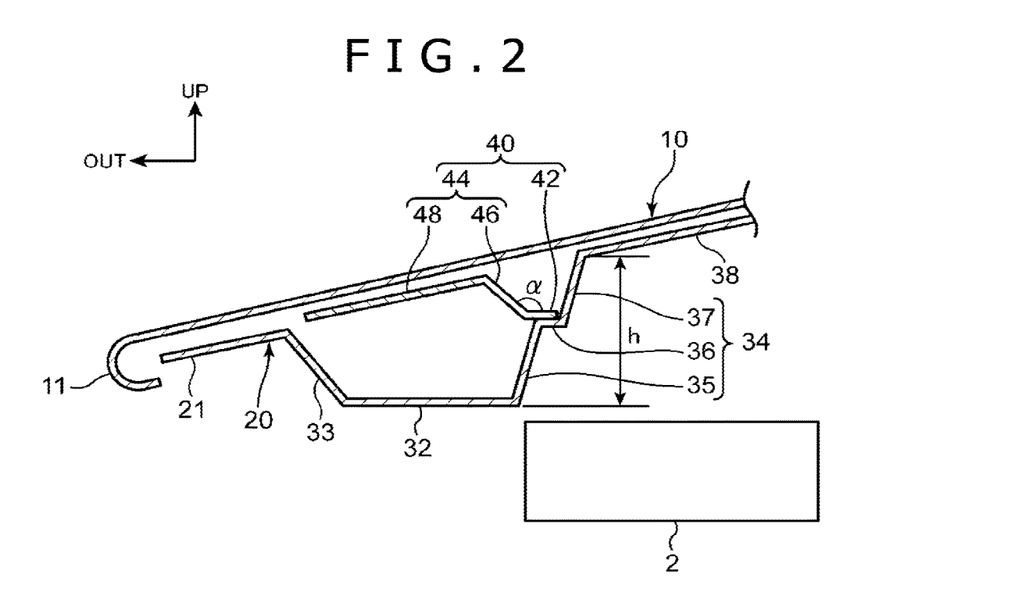
FIG. 2 is a sectional view along a line II-II of FIG. 1.

The outer panel 10 is made of aluminum or an aluminum alloy. As shown in FIG. 2, an edge portion of the outer panel 10 configures a folded grip part 11 that grips an edge portion 21 of the inner panel 20 from both sides in the thickness direction of the inner panel 20 while being folded inward (to an inner panel 20 side). The folded grip part 11 is formed through a process of inwardly folding the edge portion of the outer panel 10 (hemming).

The inner panel 20 is made of aluminum or an aluminum alloy. The strength of the inner panel 20 is appropriately set such that the inner panel 20 can efficiently absorb the collision energy while being crushed during collision of the inner panel 20 with a built-in component (engine or the like) 2 of the vehicle body. The inner panel 20 has a plurality of (in this embodiment, three) central beads 22, a bottom 32, an upright wall 34, and an opposed part 38. The central beads 22, the bottom 32, the upright wall 34, and the opposed part 38 are formed by press forming of a sheet material made of aluminum or an aluminum alloy.

Each of the central beads 22 is provided in the middle in both the width direction and the front-back direction of the vehicle. The central beads 22 each have a shape extending along the vehicle width direction and are provided so as to be intermittently aligned along the vehicle front-back direction. Each of the central beads 22 has a bead bottom wall 23, a vertical wall 24, and a top wall 25. An undepicted adhesive component connecting the inner panel 20 and the outer panel 10 is provided on the top of the top wall 25.

In this embodiment, the bottom 32, the upright wall 34, and the opposed part 38 are provided annularly (outside the central beads 22) on the outer periphery of the central beads 22.

FIG. 2 illustrates a cross-sectional shape of a lateral end of a side face of the vehicle hood. As shown in FIG. 2, the bottom 32 is disposed substantially flat and horizontally. An inclined wall 33 is connected to an outer end of the bottom 32. The inclined wall 33 has a shape inclined to approach the outer panel 10 as running outward in the vehicle width direction. An upper end of the inclined wall 33 is connected to the edge portion 21.

The upright wall 34 has a shape rising from the bottom 32 toward the outer panel 10. Specifically, the upright wall 34 has a lower vertical wall 35, an intermediate wall 36, and an upper vertical wall 37.

The lower vertical wall 35 has a shape rising from an inner end of the bottom 32 in the vehicle width direction. Specifically, the lower vertical wall 35 has a shape inclined to approach the outer panel 10 as running inward in the vehicle width direction.

The intermediate wall 36 is connected to an upper end of the lower vertical wall 35. The intermediate wall 36 extends inward in the vehicle width direction from the upper end of the lower vertical wall 35. The intermediate wall 36 is flat and intersects with the lower vertical wall 35. The intermediate wall 36 may be parallel to the bottom 32.

The upper vertical wall 37 has a shape rising from an inner (the right side in FIG. 2) end of the intermediate wall 36. The upper vertical wall 37 has a shape inclined to approach the outer panel 10 as running inward in the vehicle width direction. The upper vertical wall 37 connects the intermediate wall 36 and the opposed part 38.

The opposed part 38 is connected to an upper end of the upper vertical wall 37 while being opposed to the outer panel 10. The opposed part 38 is provided at a position close to the outer panel 10. The adhesive component is provided on the top of the opposed part 38. The opposed part 38 is connected to the outer panel 10 with the adhesive at a position close to the outer panel 10. The dimension between the bottom 32 and the intermediate wall 36 in the vertical direction is set to ½ or more of the dimension h between the bottom 32 and the boundary between the opposed part 38 and the upper vertical wall 37 in the vertical direction.

The deformable part 40 is joined to the inner panel 20. The deformable part 40 deforms with the outer panel 10 when the outer panel 10 deforms toward the inner panel 20. As shown in FIG. 1, the deformable part 40 has a shape extending in the vehicle front-back direction. The deformable part 40 has a joint part 42 and a displaceable part 44.

The joint part 42 is a portion to be joined to the inner panel 20. In this embodiment, the joint part 42 is joined to the intermediate wall 36. The joint part 42 is flat. It is to be noted that "joining" includes welding such as spot welding, mechanical joining by rivets, and the like.

The displaceable part 44 is provided at a position close to the outer panel 10 above the bottom 32. The adhesive component is provided on the top of the displaceable part 44. The displaceable part 44 is connected to the outer panel 10 with the adhesive component at a position close to the outer panel 10. Specifically, the position close to the outer panel 10 means a position away from the outer panel 10 by the thickness of the adhesive component. When the outer panel 10 deforms toward the inner panel 20, the displaceable part 44 can be downward displaced with the outer panel 10 to below the joint part 42. The displaceable part 44 has a shape bent to be convex upward. In this embodiment, the displaceable part 44 is bent so as to be convex upward. However, the displaceable part 44 may be curved so as to be convex upward. The displaceable part 44 can be inverted so as to be convex downward while being downward displaced with the outer panel 10 to below the joint part 42. Specifically, the displaceable part 44 has an inclined part 46 and an interference part 48.

The inclined part 46 is connected to the joint part 42. The inclined part 46 is flat, and has a shape inclined so as to approach the outer panel 10 as being farther from the joining part 42 in a direction from the intermediate wall 36 to the bottom 32 (in this embodiment, outward in the vehicle width direction) in a direction parallel to the intermediate wall 36. The angle α between the inclined part 46 and the joint part 42 is an obtuse angle. The angle α is preferred to be set to 135° to 180°. In this embodiment, the angle α is set to 135°.

Figure 3:
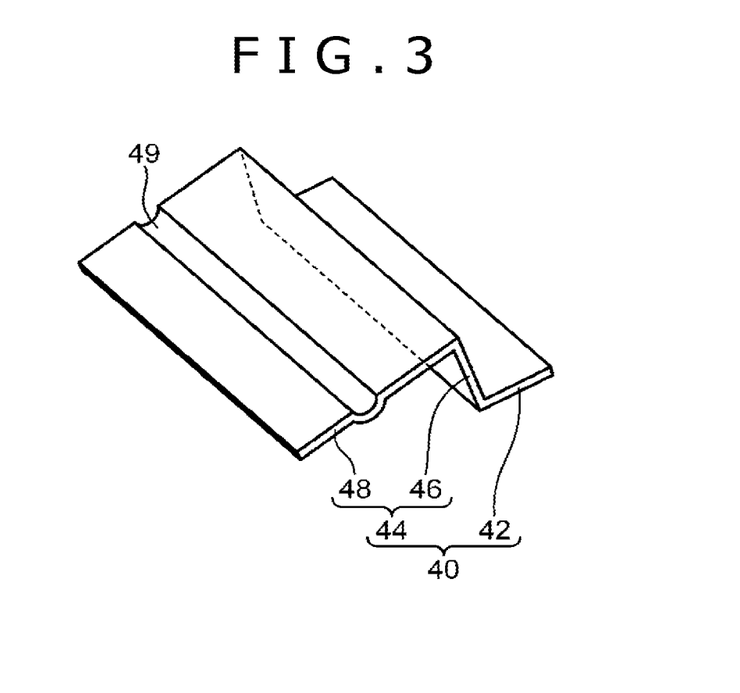
FIG. 3 is a perspective view of a deformable part.

The interference part 48 is connected to the upper end of the inclined part 46. The interference part 48 interferes with the outer panel 10 when the outer panel 10 deforms toward the inner panel 20. The interference part 48 is substantially flat (along the outer panel 10) and intersects with the inclined part 46. The interference part 48 is close to the outer panel 10. The adhesive component is provided on the top of the interference part 48. That is, the interference part 48 is connected to the outer panel 10 with the adhesive component at a position close to the outer panel 10. The size of the interference part 48 in the vehicle width direction is set to a size that allows an outer end of the interference part 48 to be not in contact with the inclined wall 33 during displacement of the interference part 48 toward the bottom 32. As shown in FIG. 3, the interference part 48 has a high-stiffness part 49. The high-stiffness part 49 has stiffness higher than the stiffness of any other portion of the interference part 48. The high-stiffness part 49 has a shape that continuously runs to extend along the vehicle front-back direction. In this embodiment, the high-stiffness part 49 has a shape that is recessed so as to be convex downward from another portion of the interference portion 48. However, the high-stiffness part 49 may be formed by folding the outer end of the interference portion 48 inwardly in the vehicle width direction.

Figure 4:
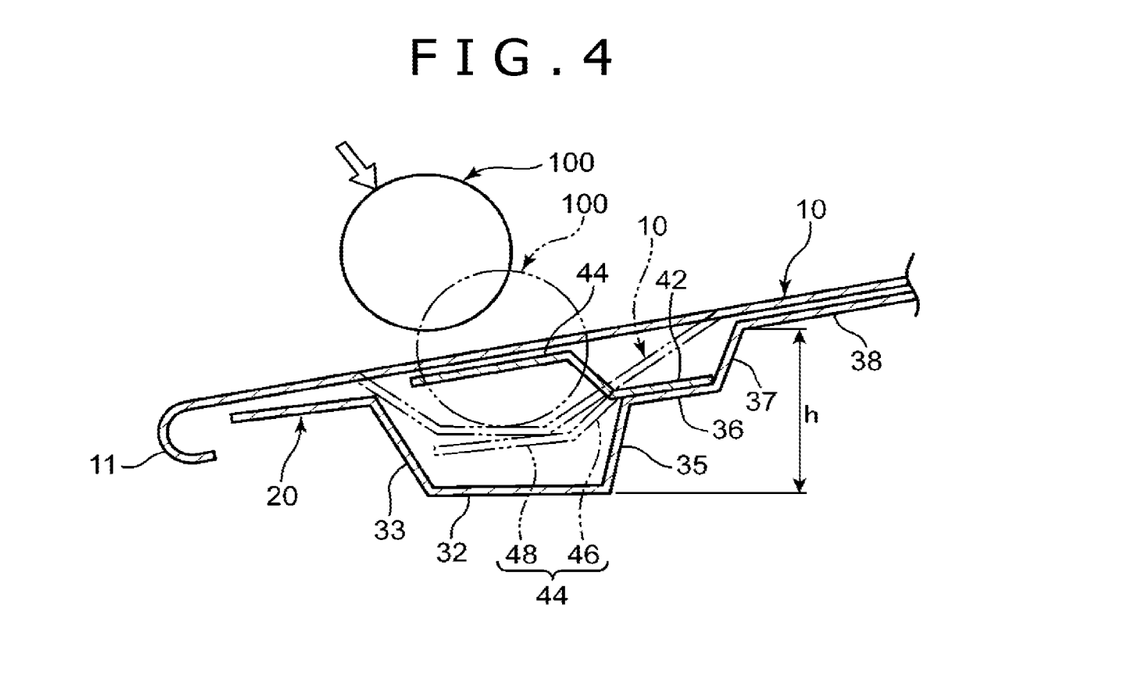
FIG. 4 is a view illustrating a state of each of an outer panel and a deformable part at collision with an impactor.

A case where an impactor 100 simulating a head collides with the side portion of the described vehicle hood is now described with reference to FIG. 4.

Figure 5:
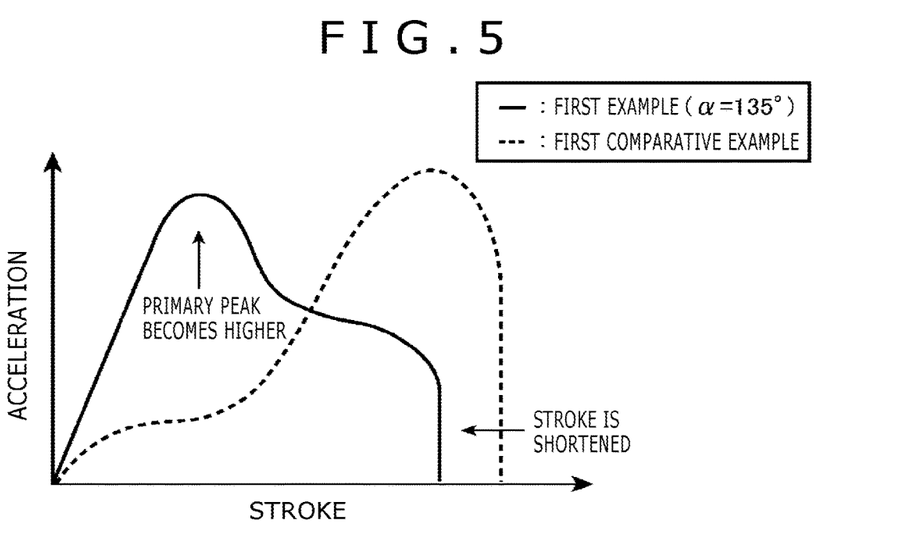
FIG. 5 is a diagram illustrating a relationship between a stroke and an acceleration of the impactor.

When the impactor 100 collides with the vehicle hood, the outer panel 10 deforms toward the inner panel 20 in a recessed manner. Specifically, the outer panel 10 comes into contact with the interference part 48 of the displaceable part 44, and is then displaced with the displaceable part 44 toward the bottom 32. More specifically, the displaceable part 44 is displaced so as to approach the bottom 32 with the boundary between the inclined part 46 and the joint part 42 as a fulcrum. That is, the mass of the components displaced with the outer panel 10 increases; hence, the acceleration primary peak of the impactor 100 increases as shown in FIG. 5. FIG. 5 shows a relationship between a stroke (displacement amount) and an acceleration of the impactor 100. In FIG. 5, a relationship between a stroke and an acceleration of an impactor 100 having no deformable part 40 is indicated by a broken line as a first comparative example.

In this embodiment, since the interference part 48 has the high-stiffness part 49, when an impact is applied to a specific portion of the interference part 48, such impact load propagates in the front-back direction of the interference part 48 from the specific portion along the high-stiffness part 49. The displaceable part 44 is therefore generally displaced toward the bottom 32 of the inner panel 20; hence, the acceleration primary peak effectively increases.

After that, the outer panel 10 and the displaceable part 44 are continuously displaced toward the bottom 32. When the boundary between the inclined part 46 and the interference part 48 approaches a plane including the joint part 42, the displaceable part 44 is inverted to be convex downward as indicated by a two-dot chain line in FIG. 4. That is, the structure of the deformable part 40 of this embodiment is less likely to cause collapsed residues during deformation, and thus can delay generation of the acceleration secondary peak. This makes it possible to effectively utilize a space between the outer panel 10 and the inner panel 20 to increase the amount of energy absorption before generation of the acceleration secondary peak. As a result, the acceleration secondary peak is controlled to be small. Consequently, the HIC score decreases. The inversion means that the convex direction of the displaceable part 44 changes from upward to downward. In addition, when a convex direction of the displaceable part 44 is downward, each of the inclined part 46 and the interference part 48 does not limitedly have a flat shape as indicated by the two-dot chain line in FIG. 4. The displaceable part 44 may be displaced toward the bottom 32 without inversion of its convex direction depending on angles of collision of the impactor 100 with the outer panel 10.

In this embodiment, the angle α between the inclined part 46 and the joint part 42 is an obtuse angle. Hence, when the impactor 100 collides with the outer panel 10, it is suppressed that the inclined part 46 buckles (stretches) and thus acts as a resistance against deformation of the outer panel 10. The displaceable part 44 is therefore easily displaced toward the bottom 32. In addition, since the angle α is 135°, the inversion of the displaceable part 44 is accelerated. Furthermore, since the dimension between the bottom 32 and the intermediate wall 36 in the vertical direction is set to ½ or more of the dimension h between the bottom 32 and the opposed part 38 in the vertical direction, contact of the inverted displaceable part 44 with the bottom 32 is suppressed. It is therefore effectively suppressed that the deformable part 40 remains collapsed and thus acts as a resistance against deformation of the outer panel 10. That is, an increase in acceleration secondary peak is effectively suppressed.

The embodiment disclosed herein should be considered to be exemplarily, or not limitedly, shown in all respects. The scope of the invention is defined by claims rather than the description of the embodiments, and includes all modifications and alterations in the sense equivalent to or within the scope of claims.

Figure 8:
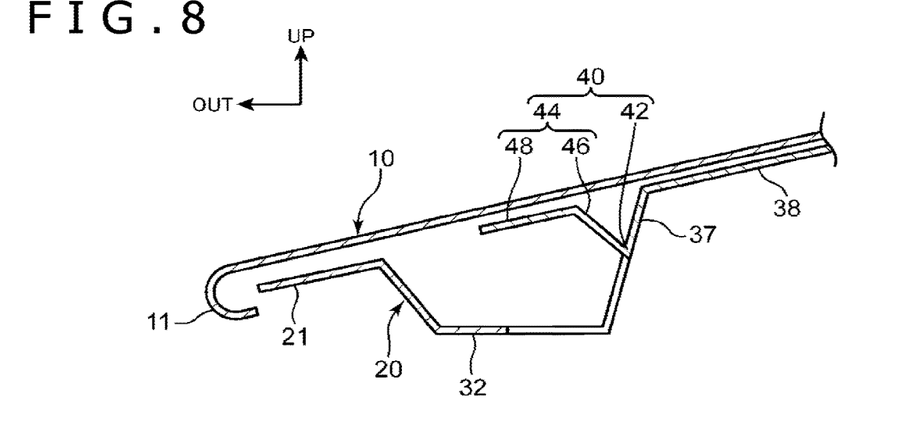
FIG. 8 is a sectional view illustrating a modification of the deformable part.

For example, the deformable part 40 may be integrally formed with the inner panel 20. Specifically, as shown in FIG. 8, the deformable part 40 may be formed by cutting and raising part of the inner panel 20 (part of each of the lower vertical wall 35 and the bottom 32).

Figure 9:
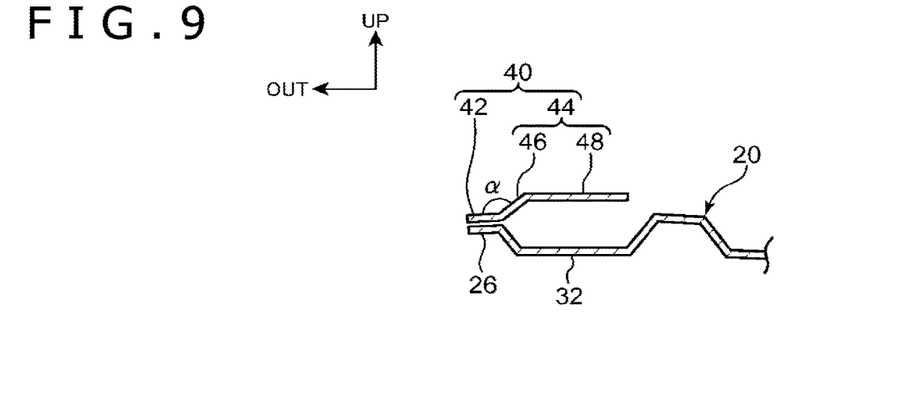
FIG. 9 is a sectional view illustrating a modification of the deformable part.

Furthermore, as shown in FIG. 9, the joint part 42 may be joined to a step part 26 formed at an outer end of the inner panel 20 in the vehicle width direction. The step part 26 may be gripped by the folded grip part 11. In FIG. 9, illustration of the outer panel 10 is omitted.

The joint part 42 may be joined to the opposed part 38, and the displaceable part 44 may have a shape along the outer panel 10.

The object to be joined to the deformable part 40 is not limited to the side portion in the vehicle width direction. The deformable part 40 may be joined to an end of the inner panel 20 on the front or rear side of the vehicle.

A trim hole, which penetrates through the boundary between the inclined part 46 and the interference part 48 in the thickness direction of the boundary, may be formed at the boundary. This accelerates inversion of the displaceable part 44 such that the displaceable part 44 is convex downward while the displaceable part 44 is displaced with the outer panel 10 toward the bottom 32.

A trim hole, which penetrates through the inclined part 46 in its thickness direction, may be formed in the inclined part 46.

The central bead 22 of the inner panel 20 does not limitedly have the shape in the above-described embodiment. For example, the central beads 22 may each have a shape extending along the vehicle front-back direction and may be provided so as to be intermittently aligned along the vehicle width direction. The central beads 22 may include a central bead having a shape extending along a direction intersecting with both the vehicle width direction and the vehicle front-back direction. In such a case, an opening may be partially formed in the bead bottom wall 23.

The top wall of the central bead may be hexagonally shaped. In such a case, an opening may be formed in a portion of the inner panel surrounded by the top wall.

Alternatively, the inner panel 20 may have a plurality of truncated conical support parts (not shown) instead of the central beads 20. In such a case, each support part is joined to the outer panel 10 with an adhesive component.

Example

Figure 6:
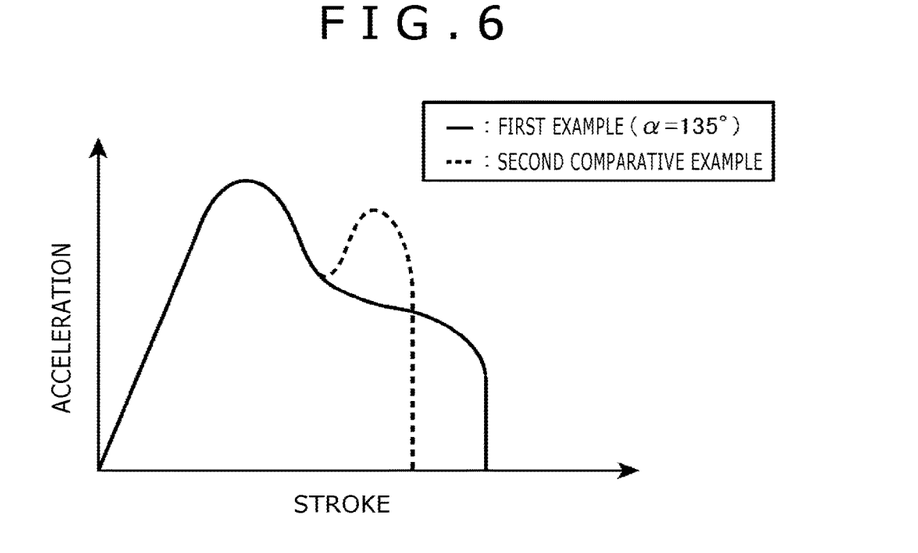
FIG. 6 is a diagram illustrating a relationship between a stroke and an acceleration of the impactor.
Figure 7:
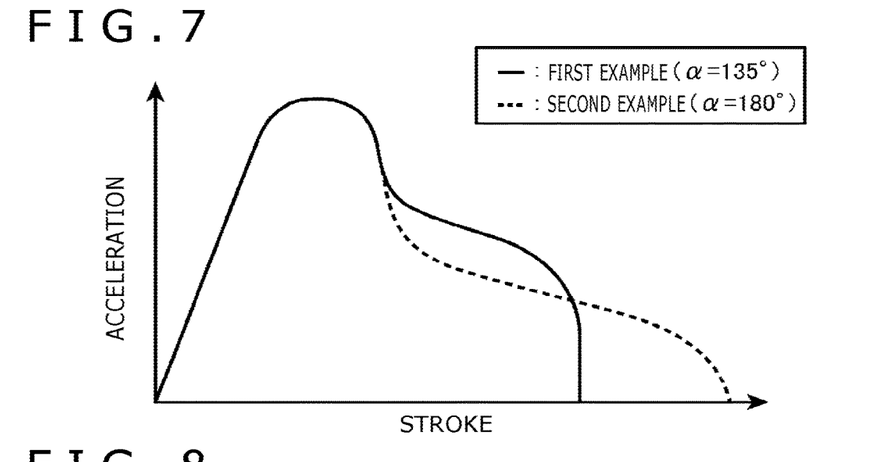
FIG. 7 is a diagram illustrating a relationship between a stroke and an acceleration of the impactor.

Evaluation of the pedestrian protection performance in the above-described embodiment is now described together with comparative examples with reference to FIGS. 5 to 7. FIGS. 5 to 7 each show a relationship between a stroke and an acceleration of the impactor 100 when the impactor 100 collides with the outer panel 10.

In FIG. 5, a relationship between the stroke and the acceleration of the impactor 100 is shown by a solid line as a first example in which the angle α defined by the inclined part 46 and the joint part 42 is 135°, and a relationship between the stroke and the acceleration of the impactor 100 is shown by a broken line as a first comparative example having no deformable part 40. As shown in FIG. 5, the first example shows a higher acceleration primary peak and a shorter stroke of the impactor 100 than the first comparative example.

In FIG. 6, the first example is shown by a solid line, and a relationship between the stroke and the acceleration of the impactor 100 is shown as a second comparative example by a broken line, in which an existing substantially-hat-type reinforcing member is joined to the bottom 32 of the inner panel 20. The reinforcing member includes a pair of flange parts joined to the bottom 32, a pair of shock absorbing vertical walls rising from the flange parts toward the outer panel, and a top connecting between the ends (upper ends) close to the outer panel of the shock absorbing vertical walls. In the second comparative example, although the acceleration primary peak is high as with the first example, the acceleration secondary peak is also high due to the collapsed residues of the reinforcing member.

In FIG. 7, the first example is shown by a solid line, and a relationship between the stroke and the acceleration of the impactor 100 is shown by a broken line as a second example, in which the angle α defined by the inclined part 46 and the joint part 42 is 180°. In the second example, the joint part 42 is joined to the opposed part 38, and the displaceable part 44 has a shape along the outer panel 10. As shown in FIG. 7, the acceleration primary peak is effectively increased in the second example as with the first example. On the other hand, the second example shows a smaller acceleration secondary peak but shows a somewhat longer stroke than the first example. The angle α of 135° is therefore more preferred.

This application claims priority to Japanese Patent Application No. 2016-070580, filed Mar. 31, 2016, the entirety of which is hereby incorporated by reference.

What is claimed is:

1. A vehicle hood comprising:
an outer panel;
an inner panel disposed below the outer panel; and
a deformable part that is joined to the inner panel and deforms with the outer panel when the outer panel deforms toward the inner panel,
wherein the inner panel includes
a bottom,
an upright wall rising from the bottom toward the outer panel, and
an opposed part that is connected to an upper end of the upright wall and is opposed to the outer panel,
wherein the deformable part includes
a joint part joined to an intermediate wall of the upright wall, the intermediate wall being located between a lower end and the upper end of the upright wall, or joined to the opposed part, and a displaceable part that is close to the outer panel above the bottom and capable of being downward displaced with the outer panel to below the joint part when the outer panel deforms toward the inner panel.

2. The vehicle hood according to claim 1,
wherein:
the joint part is joined to the intermediate wall; and
the displaceable part has a shape bent to be convex upward and is invertible so as to be convex downward while being downward displaced with the outer panel to below the joint part.

3. The vehicle hood according to claim 2,
wherein a dimension between the bottom and the intermediate wall in a vertical direction is set to ½ or more of a dimension between the bottom and the opposed part in the vertical direction.

4. The vehicle hood according to claim 2 or 3,
wherein:
the upright wall includes
a lower vertical wall connecting the bottom and the intermediate wall, and
an upper vertical wall connecting the intermediate wall and the opposed part;
the intermediate wall is flat and intersects with both the lower vertical wall and the upper vertical wall;
the deformable part is made up of a component different from the inner panel;
the joint part is flat;
the displaceable part includes an inclined part that is flat and connected to the joint part, and is inclined so as to approach the outer panel as being more away from the joint part in a direction from the intermediate wall to the bottom in parallel with the intermediate wall; and
an angle defined by the joint part and the inclined part is an obtuse angle.

5. The vehicle hood according to claim 4,
wherein an angle defined by the joint part and the inclined part is 135° to 180°.

6. The vehicle hood according to claim 1,
wherein:
the bottom, the upright wall, and the opposed part each have a shape extending in a vehicle front-back direction in a side portion in a vehicle width direction of the inner panel; and
the deformable part has a shape extending along the vehicle front-back direction.

7. The vehicle hood according to claim 6,
wherein the displaceable part has a high-stiffness part having stiffness higher than stiffness of any other portion of the displaceable part, and has a shape that continuously runs to extend along the vehicle front-back direction.

8. The vehicle hood according to claim 7,
wherein the high-stiffness part has a shape that is recessed from another portion of the displaceable part so as to be convex downward.

* * * * *